Jan. 20, 1942.     R. A. MILLS     2,270,461
APPARATUS FOR DRAWING PLOTTING AND READING GRAPHS
Filed Feb. 7, 1940     2 Sheets-Sheet 1

Inventor:
Robert A. Mills,
By Cushman, Darby & Cushman
Attys.

Jan. 20, 1942.  R. A. MILLS  2,270,461
APPARATUS FOR DRAWING PLOTTING AND READING GRAPHS
Filed Feb. 7, 1940  2 Sheets-Sheet 2

Inventor:
Robert A. Mills,
By Cushman, Darby & Cushman
Attys.

Patented Jan. 20, 1942

2,270,461

UNITED STATES PATENT OFFICE 2,270,461

APPARATUS FOR DRAWING, PLOTTING AND READING GRAPHS

Robert Arthur Mills, Leeds, England

Application February 7, 1940, Serial No. 317,783
In Great Britain February 18, 1939

7 Claims. (Cl. 33—18)

This invention relates to apparatus for drawing, plotting and reading graphs and has for its chief object to provide a new or improved graph-making and reading apparatus whereby graphs can be made and read with greater ease, speed and accuracy.

According to the invention the apparatus comprises a tracing point adapted to be moved over and relatively to the record sheet, and is characterized in that the said relative movements are registered upon one or more scales mounted upon the apparatus at or near the operating mechanism.

In order that the invention may be clearly understood and readily carried into effect, the same will now be more fully described with reference to and by the aid of the accompanying drawings, wherein.

Figure 1:
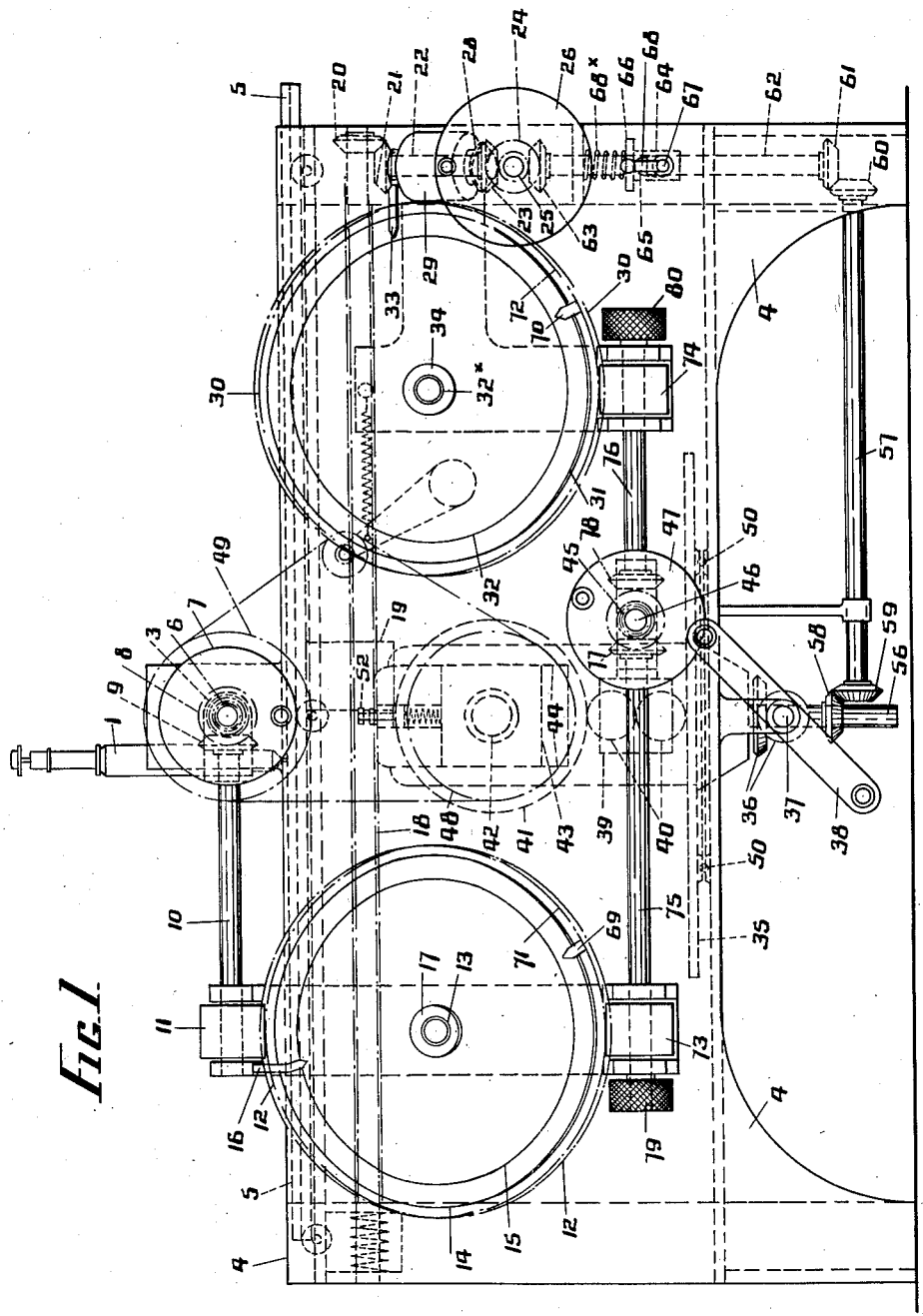
Figure 1 is a front elevation of a graph recording apparatus.
Figure 2:
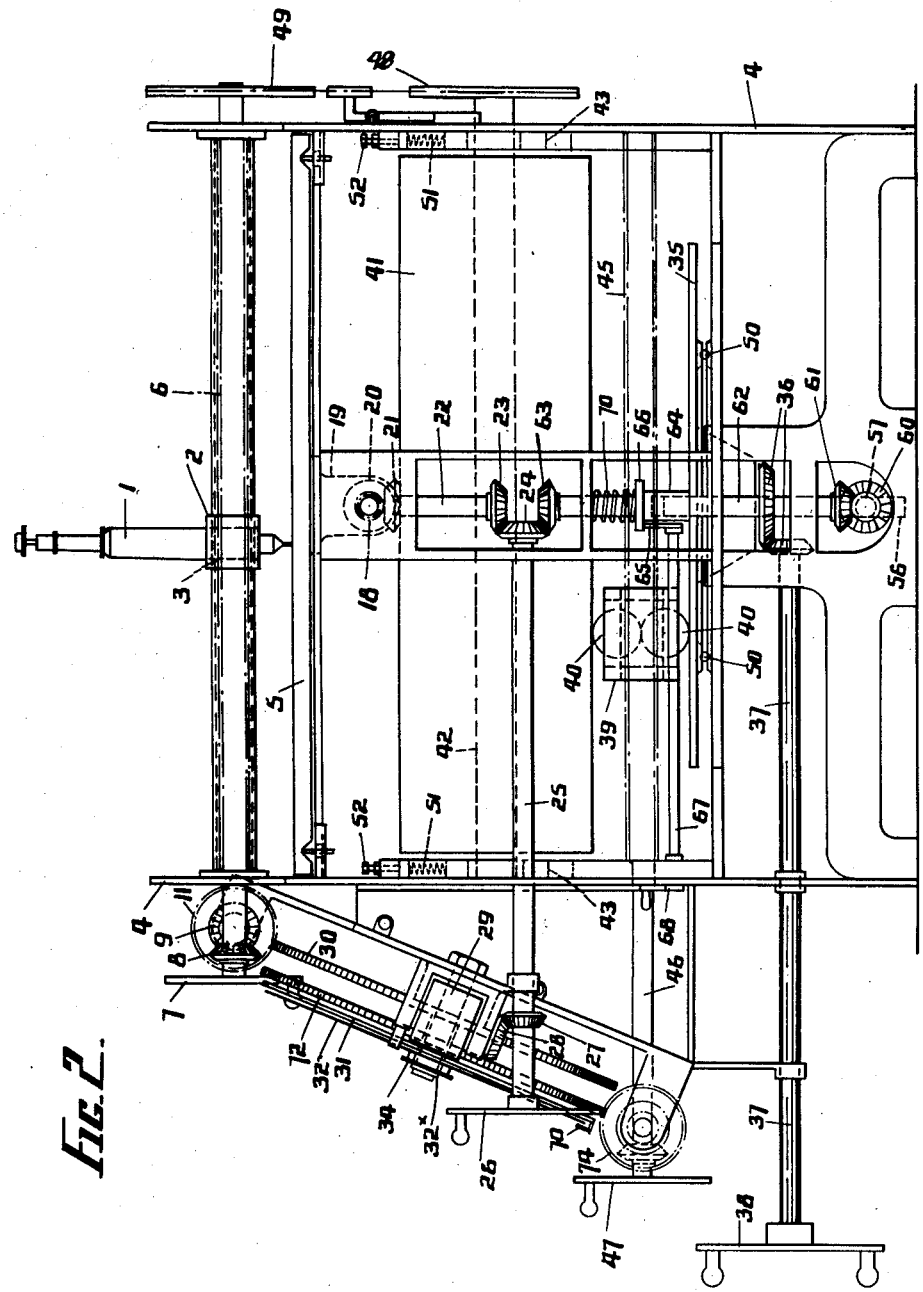
Figure 2 is a side elevation of Figure 1.

Referring to the drawings, the apparatus comprises a tracing point 1, mounted in a carrier 2, which is adapted to be moved along a fixed bridge member 3 secured to the frame 4 and positioned over the chart or record sheet which is fixed on the table 5. The movement of the tracing point 1 is controlled by a rotatable lead screw 6 working in conjunction with the tracing point carrier 2 which is attached to a collar sliding within the bridge member 3, and screw threaded to receive said rotatable lead screw 6, so that when the latter is rotated by the hand wheel 7, the tracing point carrier 2, together with the tracing point 1 is caused to move along the fixed bridge member 3 in either direction according to the direction of rotation imparted to the lead screw 6.

Connected to the lead screw 6 through the medium of the bevel gears 8, 9 and shaft 10 is a worm 11 driving a worm wheel 12 to which is rigidly connected by a hollow tube 13, the chart plate 14 carrying one of a number of interchangeable graduated charts or scales 15 which can be rotated and set by reference to a fixed pointer 16 to the value indicated by the position of the tracing point on the graph. The chart or scale 15 is secured upon the hollow tube 13 by a milled nut 17 so that any scale can be quickly removed and substituted by another. The movement of the chart plate 14 and scale 15 relative to the fixed pointer 16 is proportional to or represents and portrays the movement of the tracing point 1 across the bridge member 3 according to the ratio of the gears connecting the lead screw 6 to the chart plate worm wheel 12. As already stated the movement of the chart plate 14 relative to the fixed pointer 16 corresponds to the movement of the tracing point 1 and it will be appreciated that by suitably calibrating the scale 15, the movement of the tracing point 1 can be made to represent any desired units or progression of figures as set out on said scale 15. Subsidiary charts (not shown) can be rotatably mounted on the collar of the milled nut 17, whereby through addition to and subtraction from the original chart whether arithmetically or logarithmically divided or single multiple rings of graduations the evaluation, drawing, plotting or reading of both arithmetic and geometric averages and the construction and reading of chain indices can be performed without any necessity for mathematical calculation.

A second displacement of the tracing point 1 relatively to the record sheet is obtained by causing the table 5 upon which the record paper is secured, to be moved at right angles to the travel of the tracing point 1 along the bridge member 3. This movement is brought about by a lead screw 18 which passes through a correspondingly screwed collar 19 secured to the table 5, said lead screw 18 being rotated by the bevel gears 20, 21, vertical shaft 22, further bevel gears 23, 24 and further shaft 25 by a hand wheel 26 on the said shaft 25, whilst further bevel gearing 27, 28 operatively connects the shaft 25 to a worm 29 engaging a worm wheel 30, which when rotated causes the chart plate 31 and scale 32 to move relatively to the fixed pointer 33 on the frame 4 in a similar manner to the other chart plate 14 and scale 15 already described. The scale 32 is secured upon the chart plate 31 by a milled nut 34 on the hollow tube $32^x$ in such a manner that it can be quickly removed and substituted by another. Subsidiary scales or charts can be utilized in the manner aforementioned in order to eliminiate or facilitate mathematical calculations.

It will be realized that the calibrations of the various scales 15 and 32 will correspond to nature or terms of the data or statistics from which the graph is to be or has been made, and also that the apparatus is equally suitable either for the production of new graphs from existing data or for providing a reading of the relative data from existing graphs, in addition to keeping existing graphs or current charts periodically up to date.

In order to produce straight line graphs it is necessary to link together the two movements of the tracing point and table which provide the vertical and horizontal, viz. ordinate and abscissa or vice versa of the graph in such a manner that a resultant line is drawn on the graph direct from one co-ordinate to the next.

The movements are adapted to be linked together through the medium of a variable friction gear capable of providing ratios from minus $x$ to plus $x$ through zero. Said variable friction gear comprises a rotatable circular base plate or disc 35 adapted to be rotated through bevel gearing 36 by a shaft 37 and master or operating handle 38 situated at the front of the apparatus. A cage 39 having a pair of balls 40 mounted in rolling frictional engagement one upon the other is provided which has incorporated means to keep the balls in position comprising suitably positioned anti-friction rollers. The lower ball of the pair is in frictional engagement with the base plate or disc 35, whilst the upper ball frictionally engages a roller 41 mounted upon the shaft 42 in bearing blocks 43 slidably mounted in guides 44 on the frame 4 of the apparatus. The ball cage 39 is adapted to be moved diametrically across the base plate or disc 35 by the lead screw 45 rotated by the shaft 46 and hand wheel 47. As the distance of the vertical axis of the balls 40 from the centre of the base plate or disc 35 increases, the rate at which the roller 41 is driven increases a corresponding or relative amount, and, since the roller 41 is connected by the chain sprocket wheels 48, 49 to the leadscrew 6, the tracing point 1 is moved along the bridge member 3 a distance determined by the position of the balls 40 on the base plate or disc 35 and the corresponding gear ratio between the disc 35 and the roller 41. In order to ensure an even running and freely rotatable base plate or disc 35, the latter may be mounted upon ball bearings 50, and further to ensure a non-slipping frictional drive, the base plate or disc 35 may be spring pressed into engagement with the balls 40 by suitable springing means (not shown).

In the embodiment illustrated, the roller 41 is spring mounted through the medium of a pair of bearing blocks 43 sliding in guide slots 44 provided one at each end of the roller 41 in the frame 4 and being loaded by springs 51 to maintain the roller 41 is frictional rolling engagement with the upper ball 40, the tension of the springs 51 being adjustable by means of the set screws 52. If desired, instead of having the compression springs 51, suitable tension springs (not shown) may be provided at each end of the roller 41.

A drive is taken from the shaft 56 upon which the base plate or disc 35 is mounted along a further shaft 57 through the bevel gears 58, 59 and thence through further bevel gearing 60, 61 which connects said shaft 57 to a vertical shaft 62 having associated therewith a bevel gear 63 which can be brought into and out of mesh with the gear 24 on the second displacement or table operating shaft 25. The bevel gear 63 is moved into and out of engagement with the said gear 24 by virtue of it being mounted on a telescopically arranged shaft 64, the telescopic movement of the shaft 64 upon the shaft 62 being controlled by a cam 65 which bears against a collar 66 and is operated by a rod 67 and handle 68 at the front of the apparatus. A loading spring 68$^x$ is provided to normally hold the gear 63 in the inoperative position.

The diametrical movement of the ball cage 39 across the base plate or disc 35 is indicated upon either of the scales 15 or 32 by means of the indicators 69, 70 attached to their respective worm wheels 71, 72 which are rotated through the medium of the worms 73 and 74 mounted one on each shaft 75 and 76 respectively. Shafts 75 and 76 may be geared to the shaft 46 which operates the ball cage 39 and lead screw 45 by the slidably mounted change-over bevel gears 77 and 78 so that either shaft may be connected to the said shaft 46. In order that the indicators 69, 70 shall register with the fixed zero pointers 16, 33 when the ball cage is central on the discs, hand setting is provided for moving the pointers or indicators 69, 70 in the form of knurled knobs 79, 80, mounted upon extensions of the shafts 75 and 76 so that the latter may be rotated together with the worms 73 and 74 which rotate the worm wheels 71 and 72.

Alternatively shafts 75, 76 may be permanently geared to the shaft 46 in which case the zero pointers 16, 33 are set to register with the indicators 69, 70 when the ball cage is central on the disc.

The calibration of the scales may be arithmetic, logarithmic, trigonometrical or in accordance with any other desired natural or mathematical function. A particular case of the use of logarithmic scales is to provide percentage or ratio graphs in any position on plain paper if desired, without confusing interruption, this having the additional advantage of enabling a statistician to draw continuous ratio graphs of business or economic factors and indices even though the unit of valuation be altered or the basis of reference be changed.

When drawing the straight line graph, suitably calibrated scales are placed upon the chart plates 14 and 31 and the scale 15 on the left hand chart plate 14 is set relative to the fixed pointer 16 so that the starting point of the tracing point 1 represents the first data value of one co-ordinate. The ball cage 39 which must be at zero or on the axis of the base plate or disc 35 when the intermeshed indicator 69 or 70 is opposite the corresponding fixed pointer 16 or 33, is moved by means of its hand wheel 47 until the pointer or indicator 69 on the worm wheel 71 is at a point which corresponds with the second data value on the scale 15. The scale 32 on the right hand chart plate 31 is adjusted relative to the fixed pointer or indicator 33 corresponding to the value of the second co-ordinate and the master handle 38 is operated until the scale 32 has moved the predetermined amount corresponding to the movement of the table 5 or what was previously described as the second displacement, thus effecting the desired relative movement of the tracing point 1 and table 5. The ball cage 39 is then adjusted according to the pointer or indicator 69 which is placed at the third data value by rotation of its hand wheel 47. The procedure is then repeated until the graph is either completed or the available data is finished.

Instead of the master handle 38 being used to rotate the base plate or disc 35, the shaft 56 may be driven by an electric motor (not shown) mounted say, beneath the apparatus, and further if desired, the other operating hand wheels 7, 26 or 46 may be operated electrically.

If desired, the apparatus may be used for translating drawn graphs into corresponding data by placing a graph in position upon the table and causing the tracing point to follow the graph, and the data values being read off on the indicating dials.

I claim:

1. A graph making and like statistical recording apparatus, comprising in combination, a tracing point, a table for supporting a record sheet, an interconnected driving means for causing the simultaneous movement of said tracing point and said table relatively one to another, and indicating means responsive to the relative movement between tracing point and table, said indicating means including a pair of scales and a pair of cooperating pointers for determining the degree of the respective relative movements, one of said last named pairs of elements being driven, and the two elements of said driven pair being actuated respectively from the movement of tracing point and the table whereby said cooperating scales and pointers provide a visual indication of the ordinate and abscissa data.

2. A graph making and like statistical recording apparatus, comprising in combination a tracing point, a table for supporting a record sheet, means for causing rectilinear movement of the tracing point over the table, means for causing rectilinear movement of the table in a direction at right angles to the movement of the tracing point, and driving means interconnected between said first two named means whereby simultaneous relative movement between said point and said table may be had, and indicating means responsive to the relative movement between tracing point and table, said indicating means including a pair of scales and a pair of cooperating pointers for determining the degree of the respective relative movements, one of said last named pairs of elements being driven, and the two elements of said driven pair being actuated respectively from the movement of tracing point and the table whereby said cooperating scales and pointers provide a visual indication of the ordinate and abscissa data.

3. A graph making and like statistical recording apparatus comprising in combination a tracing point, a carrier for said tracing point, a fixed hollow bridge member, a lead screw rotatably mounted within said bridge member, a travelling nut on said lead screw, an arm on said nut projecting through a longitudinal slot in said hollow bridge member and connected to the tracing point carrier, means including variable ratio gearing and a hand wheel for rotating said lead screw through said gearing and thereby causing rectilinear movement of the tracing point carrier along the hollow bridge member, a rotatable scale having an associated fixed pointer, further gearing connecting the lead screw to said scale so as to rotate the latter in accordance with the movements imparted to the tracing point, a table for supporting a record sheet over and upon which the tracing point moves to make a record, a second lead screw rotatable mounted beneath said table, a second travelling nut on said second lead screw connected to the table, means including gearing for connecting said second lead screw to said hand wheel for rotating said second lead screw and thereby causing rectilinear movement of said table, a second rotatable scale having an associated second fixed pointer, further gearing connecting the second lead screw to said second scale, so as to rotate the latter in accordance with the movements imparted to the table.

4. A graph making and like statistical recording apparatus, comprising in combination a tracing point, a carrier for said tracing point, a fixed hollow bridge member, a lead screw rotatably mounted within said bridge member, a travelling nut on said lead screw, an arm on said nut projecting through a longitudinal slot in said hollow bridge member and connected to the tracing point carrier, variable ratio gearing for rotating said lead screw, including a roller geared to said lead screw, co-operating driving members, one of which is in frictional engagement with said roller, a driving friction disc in frictional engagement with the other of said co-operating driving members, means for moving said co-operating driving members across the face of the driving friction disc and means for indicating the amount of said movement across the face of the disc, means for rotating the driving friction disc including a vertical shaft, a further shaft, an operating handle on said further shaft, and bevel gearing connecting said vertical and further shafts, a rotatable scale having an associated fixed pointer, further gearing connecting the lead screw to said scale so as to rotate the latter in accordance with the movements imparted to the tracing point, a table for supporting a record sheet over and upon which the tracing point moves to make a record, means for causing rectilinear movement of the table in a direction at right angles to the movement of the tracing point, and means including a scale for indicating the movements of the table.

5. A graph making and like statistical recording apparatus, comprising in combination a tracing point, a carrier for said tracing point, a fixed hollow bridge member, a lead screw rotatably mounted within said bridge member, a travelling nut on said lead screw, an arm on said nut projecting through a longitudinal slot in said hollow bridge member and connected to the tracing point carrier, variable ratio gearing for rotating said lead screw including a roller geared to said lead screw, co-operating driving members, one of which is in frictional engagement with said roller, a driving friction disc in frictional engagement with the other of said co-operating driving members, means for moving said co-operating driving means across the face of the driving friction disc and means including a scale for indicating the amount of said movement across the face of the disc, means for rotating the driving friction disc including a vertical shaft, a further shaft, an operating handle on said further shaft, and bevel gearing connecting said vertical and further shafts, a rotatable scale having an associated fixed pointer, further gearing connecting the lead screw to said scale so as to rotate the latter in accordance with the movements imparted to the tracing point, a table for supporting a record sheet over and upon which the tracing point moves to make a record, a second lead screw rotatably mounted beneath said table, a second travelling nut on said second lead screw connected to the table, a second vertical shaft, bevel gearing connecting the second lead screw to said second vertical shaft, a clutch on said second vertical shaft, a transverse shaft, further bevel gearing connecting said second vertical shaft and transverse shaft, further bevel gearing connecting said transverse shaft to said first mentioned vertical shaft, a second rotatable scale having an associated second fixed pointer, and further bevel gearing connecting the second lead screw to said second scale so as to rotate the latter in accordance with the movements imparted to the table.

6. A graph making and like statistical recording apparatus, comprising in combination a tracing point, a carrier for said tracing point, a fixed hollow bridge member, a lead screw rotatably mounted within said bridge member, a travelling nut on said lead screw, an arm on said nut projecting through a longitudinal slot in said hollow bridge member and connected to the tracing point carrier, variable ratio gearing for rotating said lead screw including a roller geared to said lead screw, co-operating driving members, one of which is in frictional engagement with said roller, a driving friction disc in frictional engagement with the other of said co-operating driving members, means for rotating the driving friction disc including a vertical shaft, a further shaft, an operating handle on said vertical and further shafts, a rotatable scale having an associated fixed pointer, further gearing connecting the lead screw to said scale so as to rotate the latter in accordance with the movements imparted to the tracing point, a table for supporting a record sheet over and upon which the tracing point moves to make a record, a second lead screw rotatable mounted beneath said table, a second travelling nut on said second lead screw connected to the table, a second vertical shaft, bevel gearing connecting the second lead screw to said second vertical shaft, a clutch on said second vertical shaft, a transverse shaft, further bevel gearing connecting said second vertical shaft and transverse shaft, further bevel gearing connecting said transverse shaft to said first mentioned vertical shaft, a second rotatable scale having an associated second fixed pointer, further bevel gearing connecting the second lead screw to said second scale so as to rotate the latter in accordance with the movements imparted to the table, and means for moving said co-operating driving members across the face of the driving friction disc including a third rotatable lead screw, a cage containing the co-operating driving friction members, a screwed collar on said third lead screw connected to said cage, a hand wheel for rotating said third lead screw, a further rotatable scale having an associated fixed pointer, and gearing connecting the said further scale to said third lead screw so as to rotate said further scale in accordance with the movements imparted to said cage.

7. A graph making and like statistical recording apparatus, comprising in combination, a tracing point, a table for supporting a record sheet, means to move said point, and means to move said table, a single driving means for causing the simultaneous movement of said point and said table relatively one to another, said driving means including a variable speed device interconnected between said first two named means, and indicating means responsive to the relative movement between tracing point and table, said indicating means including a pair of scales and a pair of cooperating pointers for determining the degree of the respective relative movements, one of said last named pairs of elements being driven, and the two elements of said driven pair being actuated respectively from the movement of tracing point and the table whereby said cooperating scales and pointers provide a visual indication of the ordinate and abscissa data.

ROBERT ARTHUR MILLS.